(12) United States Patent
Cuthbert et al.

(10) Patent No.: US 9,524,293 B2
(45) Date of Patent: Dec. 20, 2016

(54) TECHNIQUES FOR AUTOMATICALLY SWAPPING LANGUAGES AND/OR CONTENT FOR MACHINE TRANSLATION

(71) Applicant: Google Inc., Mountain View, CA (US)

(72) Inventors: Alexander Jay Cuthbert, Oakland, CA (US); Chao Tian, Cupertino, CA (US)

(73) Assignee: Google Inc., Mountain View, CA (US)

(*) Notice: Subject to any disclaimer, the term of this patent is extended or adjusted under 35 U.S.C. 154(b) by 35 days.

(21) Appl. No.: 14/460,672

(22) Filed: Aug. 15, 2014

(65) Prior Publication Data

US 2016/0048505 A1    Feb. 18, 2016

(51) Int. Cl.
| | | |
|---|---|---|
| *G06F 17/28* | (2006.01) | |
| *G06F 17/20* | (2006.01) | |
| *G06F 3/00* | (2006.01) | |
| *G06F 15/16* | (2006.01) | |
| *G06F 15/173* | (2006.01) | |
| *G06F 17/30* | (2006.01) | |
| *G06F 7/00* | (2006.01) | |
| *G06F 17/27* | (2006.01) | |

(52) U.S. Cl.
CPC ........... *G06F 17/289* (2013.01); *G06F 17/275* (2013.01)

(58) Field of Classification Search
CPC  G06F 17/289; G06F 17/2872; G06F 17/2785; G06F 9/4448
See application file for complete search history.

(56) References Cited

U.S. PATENT DOCUMENTS 5,541,837 A * 7/1996 Fushimoto ............ G06F 17/289
704/2
5,987,402 A * 11/1999 Murata ................. G06F 17/289
704/2

(Continued)

FOREIGN PATENT DOCUMENTS

WO    2013033910 A1    3/2013

OTHER PUBLICATIONS

"InstantTranslate", Aug. 1, 2014, XP055225018, Retrieved from the Internet: URL:http://web.archive.org/web/20140801222534/http://addons.nvda-project.org/addons/instantTranslate.en.html [retrieved on Nov. 2, 2015] (1 page).

(Continued)

*Primary Examiner* — Pierre-Louis Desir
*Assistant Examiner* — Anne Thomas-Homescu
(74) *Attorney, Agent, or Firm* — Remarck Law Group PLC

(57) ABSTRACT

A computer-implemented technique can include receiving a machine translation input specifying (i) a source text, (ii) a source language of the source text, and (iii) a target language for the source text, and obtaining a machine translation of the source text from the source language to the target language to obtain a translated source text. The technique can include determining whether to swap the source and target languages based on (i) the source text and (ii) at least one language model, and in response to determining to swap the source and target languages: swapping the source and target languages to obtain modified source and target languages, utilizing the translated source text as a modified source text, obtaining a machine translation of the modified source text from the modified source language to the modified target language to obtain a translated modified source text, and outputting the translated modified source text.

16 Claims, 3 Drawing Sheets

(56) References Cited

U.S. PATENT DOCUMENTS

| | | | | |
|---|---|---|---|---|
| 6,014,616 A * | 1/2000 | Kim | G06F 3/04812 | 345/171 |
| 6,848,080 B1 * | 1/2005 | Lee | G06F 17/2223 | 704/9 |
| 7,080,002 B1 * | 7/2006 | Kim | G06F 17/275 | 704/2 |
| 7,165,019 B1 * | 1/2007 | Lee | G06F 17/2715 | 704/10 |
| 7,533,013 B2 | 5/2009 | Marcu | | |
| 7,734,467 B2 * | 6/2010 | Gao | G10L 15/26 | 704/258 |
| 7,849,144 B2 | 12/2010 | Prajapat et al. | | |
| 8,700,998 B2 * | 4/2014 | Togami, Jr. | G06F 9/4448 | 704/2 |
| 2002/0040292 A1 * | 4/2002 | Marcu | G06F 17/271 | 704/4 |
| 2002/0188439 A1 * | 12/2002 | Marcu | G06F 17/271 | 704/5 |
| 2003/0125927 A1 * | 7/2003 | Seme | G06F 17/289 | 704/3 |
| 2003/0149687 A1 * | 8/2003 | Brown | G06F 17/289 | |
| 2004/0243392 A1 * | 12/2004 | Chino | G06F 17/27 | 704/7 |
| 2006/0095248 A1 * | 5/2006 | Menezes | G06F 17/2818 | 704/3 |
| 2007/0017971 A1 * | 1/2007 | Im | G06Q 20/20 | 235/379 |
| 2007/0128899 A1 * | 6/2007 | Mayer | G06F 9/4406 | 439/152 |
| 2007/0130563 A1 * | 6/2007 | Elgazzar | G06F 17/289 | 717/137 |
| 2007/0136266 A1 * | 6/2007 | Su | G06F 17/30864 | |
| 2007/0150257 A1 * | 6/2007 | Cancedda | G06F 17/2827 | 704/2 |
| 2007/0200827 A1 * | 8/2007 | Samal | G06F 3/0236 | 345/168 |
| 2007/0225973 A1 * | 9/2007 | Childress | G10L 13/00 | 704/211 |
| 2008/0040099 A1 * | 2/2008 | Wu | G06F 17/275 | 704/9 |
| 2008/0077393 A1 * | 3/2008 | Gao | G06F 3/018 | 704/8 |
| 2008/0177994 A1 * | 7/2008 | Mayer | G06F 9/4418 | 713/2 |
| 2008/0288474 A1 * | 11/2008 | Chin | G06F 17/30864 | |
| 2008/0312902 A1 * | 12/2008 | Dollinger | G06F 17/289 | 704/4 |
| 2009/0043563 A1 * | 2/2009 | Bode | G06F 17/289 | 704/3 |
| 2009/0070094 A1 * | 3/2009 | Best | G06F 17/289 | 704/2 |
| 2009/0083243 A1 * | 3/2009 | Heymans | G06F 17/30669 | |
| 2009/0171655 A1 * | 7/2009 | Stern | G06Q 10/00 | 704/8 |
| 2009/0204401 A1 * | 8/2009 | Bu | G10L 15/1807 | 704/260 |
| 2009/0287474 A1 * | 11/2009 | Chen | G06F 17/289 | 704/8 |
| 2010/0057433 A1 * | 3/2010 | Jackson | G06F 17/28 | 704/3 |
| 2010/0198578 A1 * | 8/2010 | Tachimori | G06F 17/275 | 704/2 |
| 2010/0274552 A1 * | 10/2010 | Gao | G06F 17/2854 | 704/2 |
| 2010/0286977 A1 * | 11/2010 | Chin | G06F 17/289 | 704/4 |
| 2010/0293498 A1 * | 11/2010 | Maxfield | G06F 3/0219 | 715/776 |
| 2011/0063141 A1 * | 3/2011 | Gabay | G06F 3/0238 | 341/23 |
| 2011/0093254 A1 * | 4/2011 | Kuhn | G06F 17/2827 | 704/2 |
| 2011/0125486 A1 * | 5/2011 | Jaiswal | G06F 17/289 | 704/3 |
| 2011/0179073 A1 * | 7/2011 | Nilsson | G06F 9/4448 | 707/769 |
| 2012/0005571 A1 * | 1/2012 | Tang | G06F 17/289 | 715/234 |
| 2012/0065957 A1 * | 3/2012 | Jungblut | G06F 17/2827 | 704/3 |
| 2012/0278060 A1 * | 11/2012 | Cancedda | G06F 17/2818 | 704/2 |
| 2012/0330990 A1 * | 12/2012 | Chen | G06F 17/28 | 707/761 |
| 2013/0050096 A1 * | 2/2013 | Fallah | G06F 3/0233 | 345/169 |
| 2013/0103384 A1 * | 4/2013 | Hunter | G06F 17/28 | 704/3 |
| 2013/0124187 A1 * | 5/2013 | Qin | G06F 3/01 | 704/8 |
| 2014/0006004 A1 * | 1/2014 | Gundepuneni | G06F 17/2264 | 704/2 |
| 2014/0006007 A1 * | 1/2014 | Sumita | G06F 17/289 | 704/4 |
| 2014/0035823 A1 * | 2/2014 | Khoe | G06F 3/02 | 345/171 |
| 2014/0067361 A1 * | 3/2014 | Nikoulina | G06F 17/2818 | 704/2 |
| 2014/0081618 A1 * | 3/2014 | Kim | G06F 17/289 | 704/2 |
| 2014/0081620 A1 * | 3/2014 | Solntseva | G06F 17/28 | 704/3 |
| 2014/0095143 A1 * | 4/2014 | Jan | G06F 17/2223 | 704/2 |
| 2014/0145962 A1 * | 5/2014 | Radhakrishnan | G06F 17/30 | 345/171 |
| 2014/0278346 A1 * | 9/2014 | Zomet | G06F 17/30707 | 704/3 |
| 2014/0297257 A1 * | 10/2014 | Shin | G06F 17/289 | 704/3 |
| 2014/0309986 A1 * | 10/2014 | El-Sharqwi | G06F 17/2755 | 704/9 |
| 2014/0358519 A1 * | 12/2014 | Mirkin | G06F 17/2854 | 704/3 |
| 2015/0057993 A1 * | 2/2015 | Phadke | G06F 17/289 | 704/3 |
| 2015/0128037 A1 * | 5/2015 | Lee | G06F 3/0481 | 715/703 |
| 2015/0134322 A1 * | 5/2015 | Cuthbert | G06F 17/289 | 704/3 |

OTHER PUBLICATIONS

International Search Report and Written Opinion for International Application No. PCT/US2015/043612 mailed Nov. 12, 2015 (14 pages).

* cited by examiner

TECHNIQUES FOR AUTOMATICALLY SWAPPING LANGUAGES AND/OR CONTENT FOR MACHINE TRANSLATION

FIELD

The present disclosure generally relates to machine translation and, more particularly, to techniques for automatically swapping languages and/or content for machine translation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Machine translation typically involves a source text being translated (the source) and a translated text (the target). Associated with these texts are source and target languages, respectively. A user may specify the source text and the target language and request a machine translation of the text from its source language to the target language. The source language may be specified or, alternatively, may be automatically detected. The user may incorrectly specify the source language and/or the target language, and they may not realize their mistake until after typing at least a portion of the source text. Such errors can cause inaccurate or entirely incorrect machine translations.

SUMMARY

A computer-implemented technique is presented. The technique can include receiving, at a server from a computing device, a machine translation input specifying (i) a source text, (ii) a source language of the source text, and (iii) a target language for the source text. The technique can include obtaining, at the server, a machine translation of the source text from the source language to the target language to obtain a translated source text. The technique can include determining, at the server, whether to swap the source and target languages based on (i) the source text and (ii) at least one language model. The technique can also include in response to determining to swap the source and target languages: swapping, at the server, the source and target languages to obtain modified source and target languages, utilizing, at the server, the translated source text as a modified source text, obtaining, at the server, a machine translation of the modified source text from the modified source language to the modified target language to obtain a translated modified source text, and outputting, from the server to the computing device, the translated modified source text.

In some embodiments, the technique further comprises outputting, from the server to the computing device, the translated source text, wherein receipt of the translated source text causes the computing device to display the translated source text in a target area opposing a source area displaying the source text. In some embodiments, receipt of the translated modified source text causes the computing device to display the translated modified source text in the target area opposing the source area displaying the modified source text.

In some embodiments, the technique further comprises outputting, from the server to the computing device, a selectable reset option to view the machine translation of the source text from the source language to the target language. In some embodiments, the technique further comprises receiving, at the server from the computing device, a selection of the selectable reset option, and in response to receiving the selection, outputting, from the server to the computing device, the translated source text, wherein receipt of the translated source text causes the computing device to display the translated source text in the target area opposing the source area displaying the source text.

In some embodiments, the technique further comprises receiving, at the server from the computing device, a typing status indicative of whether the source text is currently being typed at the computing device, wherein determining whether to swap the source and target languages is based on the typing status.

In some embodiments, determining whether to swap the source and target languages includes: not determining, at the server, whether to swap the source and target languages when the typing status indicates that the source text is currently being typed at the computing device, and determining, at the server, whether to swap the source and target languages when the typing status indicates that the source text is currently being typed at the computing device.

In some embodiments, determining to swap the source and target languages further comprises: calculating, at the server, a source confidence score, the source confidence score indicative of a degree of likelihood that the source text is in the source language, determining, at the server, whether to swap the source and target languages based on a comparison between the source confidence score and a source confidence score threshold indicative of high degree of likelihood that the source text is in the source language.

In some embodiments, determining whether to swap the source and target languages further includes: calculating, at the server, a target confidence score, the target confidence score indicative of a degree of likelihood that the source text is in the target language, and determining, at the server, whether to swap the source and target languages based on a comparison between the target confidence score and at least one of (i) the source confidence score and (ii) a target confidence score threshold indicative of high degree of likelihood that the source text is in the target language.

In some embodiments, the technique further comprises outputting, from the server to the computing device, a selectable swap option to view the machine translation of the source text from the target language to the source language, receiving, at the server from the computing device, a selection of the selectable swap option, and in response to receiving the selection, determining, at the server, to swap the source and target languages.

A server having one or more processors configured to perform operations is also presented. The operations can include receiving, from a computing device, a machine translation input specifying (i) a source text, (ii) a source language of the source text, and (iii) a target language for the source text. The operations can include obtaining a machine translation of the source text from the source language to the target language to obtain a translated source text. The operations can include determining whether to swap the source and target languages based on (i) the source text and (ii) at least one language model. The operations can include in response to determining to swap the source and target languages: swapping the source and target languages to obtain modified source and target languages, utilizing the translated source text as a modified source text, obtaining a machine translation of the modified source text from the modified source language to the modified target language to obtain a translated modified source text, and outputting, to the computing device, the translated modified source text.

In some embodiments, the operations further comprise outputting, to the computing device, the translated source text, wherein receipt of the translated source text causes the computing device to display the translated source text in a target area opposing a source area displaying the source text. In some embodiments, receipt of the translated modified source text causes the computing device to display the translated modified source text in the target area opposing the source area displaying the modified source text.

In some embodiments, the operations further comprise outputting, to the computing device, a selectable reset option to view the machine translation of the source text from the source language to the target language. In some embodiments, the operations further comprise: receiving, from the computing device, a selection of the selectable reset option, and in response to receiving the selection, outputting, to the computing device, the translated source text, wherein receipt of the translated source text causes the computing device to display the translated source text in the target area opposing the source area displaying the source text.

In some embodiments, the operations further comprise receiving, from the computing device, a typing status indicative of whether the source text is currently being typed at the computing device, wherein determining whether to swap the source and target languages is based on the typing status.

In some embodiments, determining whether to swap the source and target languages includes: not determining whether to swap the source and target languages when the typing status indicates that the source text is currently being typed at the computing device, and determining whether to swap the source and target languages when the typing status indicates that the source text is currently being typed at the computing device.

In some embodiments, determining to swap the source and target languages further comprises: calculating a source confidence score, the source confidence score indicative of a degree of likelihood that the source text is in the source language, and determining whether to swap the source and target languages based on a comparison between the source confidence score and a source confidence score threshold indicative of high degree of likelihood that the source text is in the source language.

In some embodiments, determining whether to swap the source and target languages further includes: calculating a target confidence score, the target confidence score indicative of a degree of likelihood that the source text is in the target language, and determining whether to swap the source and target languages based on a comparison between the target confidence score and at least one of (i) the source confidence score and (ii) a target confidence score threshold indicative of high degree of likelihood that the source text is in the target language.

In some embodiments, the operations further comprise: outputting, to the computing device, a selectable swap option to view the machine translation of the source text from the target language to the source language, receiving, from the computing device, a selection of the selectable swap option, and in response to receiving the selection, determining to swap the source and target languages.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, a user may incorrectly specify a source language and/or a target language when requesting machine translation of the source text. Swap functions may enable the user to swap or switch the languages and/or the texts, but problems can emerge when (i) the translated text has not yet been obtained or fully processed, such as due to computer network delays or typing delays or interruptions by the user inputting the source text and (ii) the reverse translation does not have an identity match with the original text (e.g., the translated text has multiple reverse translations back into the source language).

Accordingly, techniques are presented for automatically swapping languages and/or content for machine translation. These techniques are aimed to behave in a manner in which the user would expect. More particularly, when a swap or switch occurs, the user would expect that the source and target languages would swap as well as the content of the texts. The techniques can be implemented at a server, which can detect whether the source and target languages should be swapped using any suitable language models. The server can be configured to output machine translation user interfaces to a requesting computing device.

In some cases, swapping the languages and/or content may be inappropriate. For example, during user typing swapping the content may be inappropriate because this could cause the currently typed text to be overwritten. A static state, however, may be suitable for swapping both the source and target languages and the content. Another example scenario where swapping the languages may be inappropriate is when auto-detection of the source language is enabled. In these scenarios, there is less confidence regarding the accuracy of the source and target languages and thus swapping of the source and target languages should not occur.

When the need for a swap is detected, the server can swap the source and target languages and perform machine translation of the text from the target language (a modified source language) to the source language (a modified target language). Different rules/thresholds can be implemented for swap detection. For example, confidence scores and thresholds may be utilized to determine when to automatically swap the source and target languages. These confidence scores can include a confidence score for the source language as well as confidence score(s) for other languages, such as the target language and/or another specific language or all other languages.

Figure 1:
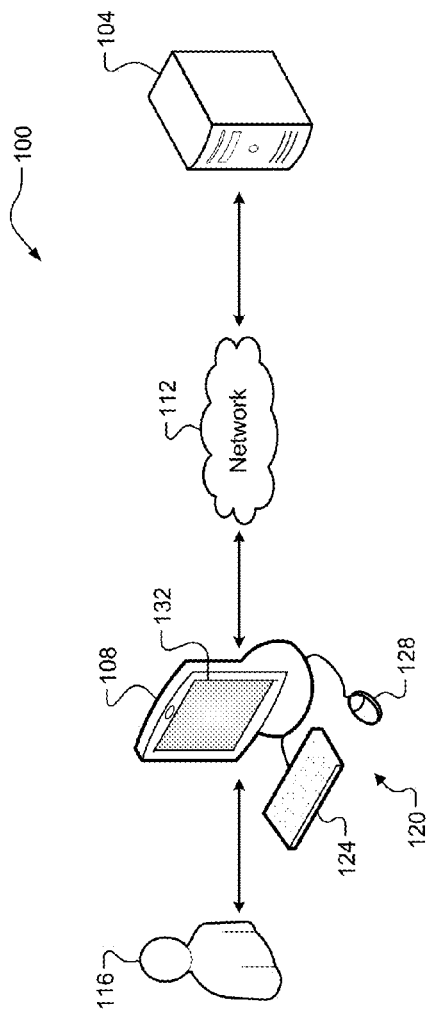
FIG. 1 illustrates a diagram of a computing network including an example server according to some implementations of the present disclosure.

Referring now to FIG. 1, a diagram of a computing network 100 including an example server 104 according to some implementations of the present disclosure is illustrated. The term "server" as used herein can refer to both a single hardware computer server and multiple hardware computer servers operating in a parallel or distributed architecture. The server 104 can communicate with a computing device 108 via a network 112. Examples of the computing device 108 include a desktop computer, a laptop computer, a tablet computer, and a mobile phone. The network 112 can include a local area network (LAN), a wide area network (WAN), e.g., the Internet, or a combination thereof.

While a single computing device 108 is shown, it should be appreciated that the server 104 can similarly communicate with other computing devices. The computing device 108 can represent a computing device requesting machine translation from the server 104. Specifically, a user 116 associated with the computing device 108 can provide a machine translation input to the computing device 108, which can then be transmitted to the server 104. The machine translation input can include (i) a source text, (ii) a source language of the source text, and (iii) a target language for the source text. In response to this machine translation input, the server 104 can provide the computing device 108 a translated text in the target language.

In one implementation, the user 108 can provide the machine translation input via a user interface 120 of the computing device 108. Examples components of the user interface include a physical keyboard 124, a mouse 128, and a display 132, such as a touch display. The computing device 108 can detect when the source text is currently being input and transmit a typing status to the server 104. The server 104 can use this typing status as part of the techniques of the present disclosure. The term "typing status" as used herein can refer to any indication that the source text is currently being input, which could include input not via the physical keyboard 128 (e.g., input via the mouse 128 or via a virtual keyboard on the display 132).

Figure 2:
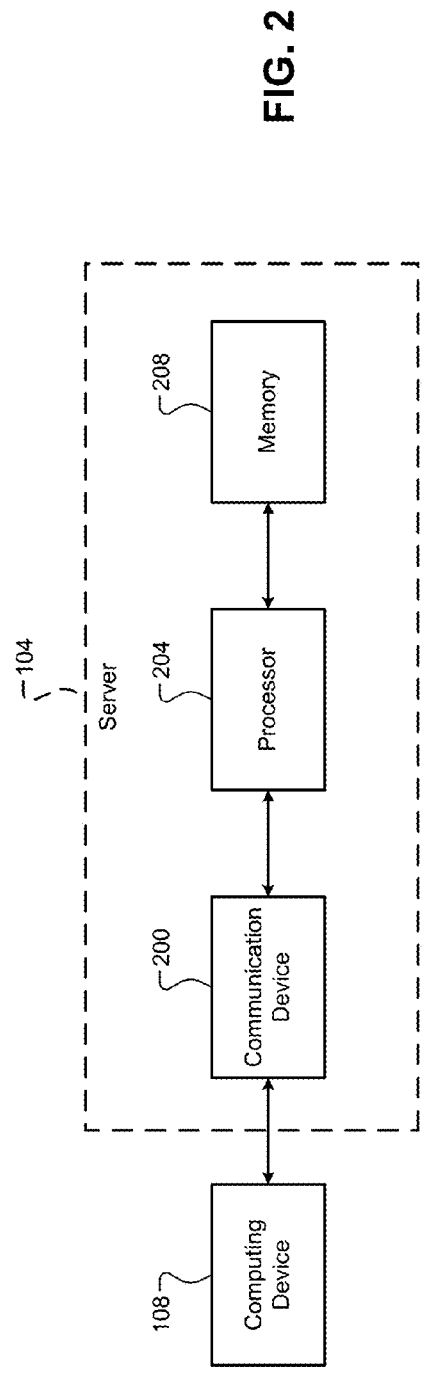
FIG. 2 illustrates a functional block diagram of the example server of FIG. 2.

Referring now to FIG. 2, a functional block diagram of the example server 104 is illustrated. The server 104 can include a communication device 200, a processor 204, and a memory 208. The communication device 200 can include any suitable components (e.g., a transceiver) configured for communication with other devices, such as the computing device 108, via the network 112. In some implementations, machine translation can be performed at a one or more separate machine translation servers that are in communication with the server 104 via the network 112 and the communication device 200. The server 104 can then utilize these machine translation(s) as part of the techniques of the present disclosure.

The processor 204 can control operation of the server 104. Example functions performed by the processor 204 include, but are not limited to, loading/executing an operating system of the server 104, controlling communication via the communication device 200, and controlling read/write operations at the memory 208. The memory 208 can be any suitable storage medium (flash, hard disk, etc.) configured to store information at the server 104. The term "processor" as used herein can refer to both a single processor and multiple processors operating in a parallel or distributed architecture. The processor 204 can also perform at least a portion of the techniques of the present disclosure, which are now described in greater detail below.

Referring now to FIG. 3A-3E and with continued reference to FIGS. 1-2, example machine translation user interfaces 300a, 300b, 300c, 300d, and 300e (collectively "machine translation user interfaces 300") are illustrated. While generally shown, each of the machine translation user interfaces 300 could be displayed at the display 132 of the computing device. For example only, the machine translation user interfaces 300 may be displayed in web browser software executing on the computing device 108 as part of a web-based machine translation interface.

Each machine translation user interface 300 includes a source text area 304 and a target text area 308. The source area 304 can receive and display the source text that the user 116 is requesting to have machine translated to a target language. The target area 308 opposes the source area 304 (side-by-side, one on top of the other, etc.) and displays the results of the machine translation, i.e., the translated text. A source language area 312 proximate to the source area 304 can receive and display the source language, and a target language area 316 proximate to the target area 308 can receive and display the target language. For example, the source text area 304 and the source language area 312 may be collectively referred to as the "source area," and the target text area 308 and the target language area 316 may be collectively referred to as the "target area."

Figure 3A:
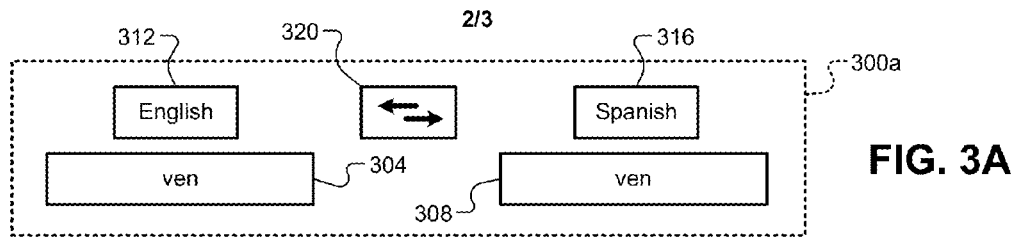
FIGS. 3A-3E illustrate example machine translation user interfaces according to some implementations of the present disclosure.

In the machine translation user interface 300a of FIG. 3A, the source text area 304 includes the source text "ven" and the source language area 312 specifies English as the source language. The target text area 308 includes the translated text "ven" and the target language area 316 specifies Spanish as the target language. In this case, the translated text can be the same as the source text for a variety of reasons. For example, the machine translation of the source text may not have been provided from the server 104 yet due to processing and/or network delays. Alternatively, for example, the user 116 could still be providing the source text as indicated by the typing status provided to the server 104 by the computing device 108. In these types of scenarios, the translated text can be set to the source text by default. If the typing status is static (e.g., indicative of the source text not currently being input at the computing device 108), the server 104 can determine whether to swap the source and target languages.

The server 104 can utilize any suitable language models to determine whether to swap the source and target languages. For example, the server 104 may use the source text and one or more language models related to the source language to determine whether to swap the source and target languages. The one or more language models may include source language model(s), target language model(s), and/or other language models. In one implementation, the server 104 can calculate a source confidence score that is indicative of a degree of likelihood that the source text is in the source language. In the machine translation user interface 300a of FIG. 3A, the source confidence score is relatively low (e.g., ~30%) for reliably determining that the source text "ven" is in English. The server 104 can determine whether to swap the source and target languages based on a comparison between the source confidence score and a source confidence score threshold indicative of high degree of likelihood that the source text is in the source language.

Figure 3B:
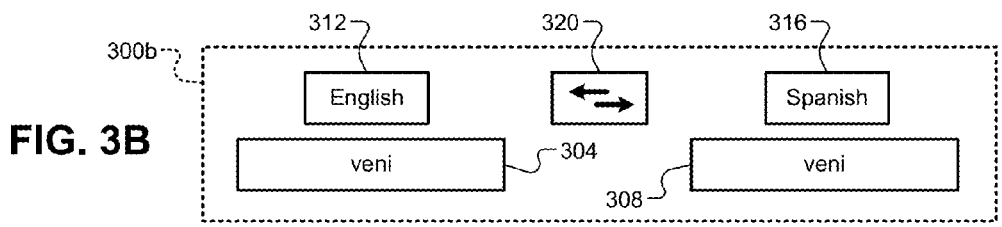

In FIG. 3B, the source confidence score is below any suitable source confidence score threshold and thus the server 104 may determine not to swap the source and target languages. At each of these stages, the server 104 can also determine the translated text in a similar fashion using language models and probabilities. In some implementations, the server 104 can also calculate a target confidence score indicative of a degree of likelihood that the source text is in the target language and determine whether to swap the source and target languages based on a comparison between the target confidence score and at least one of (i) the source confidence score and (ii) a target confidence score threshold indicative of high degree of likelihood that the source text is in the target language. This determination could be further based on comparisons to confidence scores for other specific languages or all other languages.

The source and target confidence score thresholds can be indicative of an acceptable likelihood that a corresponding language is the source or target language, respectively. In other words, these confidence score thresholds represent a high degree of likelihood such that the decision can be reliably made as to whether to swap the source and target languages. The confidence score thresholds could be predetermined, they could be learned using machine learning, they could be set by one or more users, or they could obtained in any other suitable manner. In FIG. 3B, the target confidence score is also relatively low (e.g., ~65%) for determining that the source text "ven" is in Spanish. The reliability of the target confidence score could be further analyzed by comparing it to confidence score(s) for other specific languages or all other languages. In FIG. 3B, a confidence score for all other languages is very high (e.g., ~80%), and thus the server 104 can determine not to swap the source and target languages—at least not at this time.

Figure 3C:
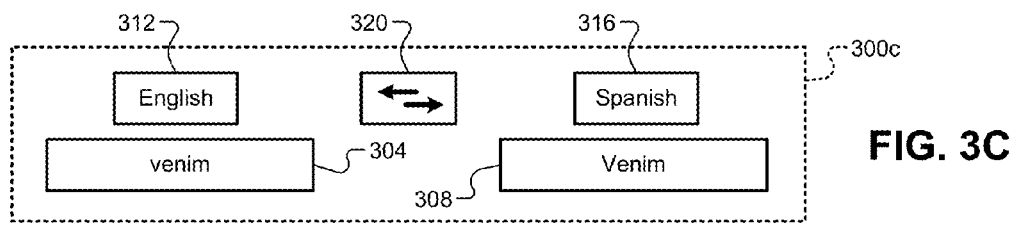

In the machine translation user interface 300c of FIG. 3C, the source text area 304 includes the source text "veni" and the target text area 308 includes the translated text "veni." Provided the typing status is static, the server 104 can again determine whether to swap the source and target languages. The source confidence score is relatively low (e.g., ~30%), while the target confidence score and a confidence score for Romanian are both very high (e.g., 90% and 95%, respectively). Nonetheless, because of the uncertainty of the target language being the correct language for the source text, the server 104 can determine not to swap the source and target languages. Similarly, in FIG. 3D, the source text area includes the source text "venim" and the target text area 308 includes the translated text "Venim." The confidence scores are again not reliable enough to justify the server 104 swapping the source and target languages. The translated text may be capitalized due to a spell checking function or an assumption that the source text is a proper name that should be capitalized.

Figure 3D:
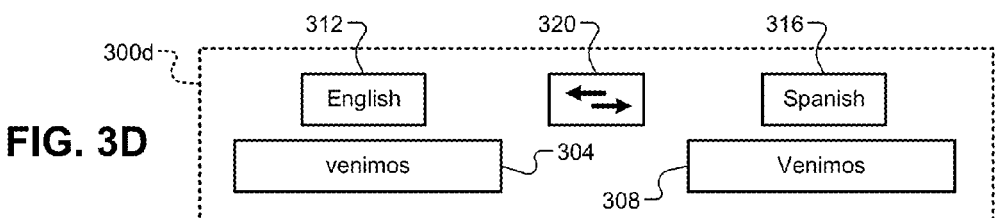

In the machine translation user interface 300d of FIG. 3D, the source text area 304 includes the source text "venimos" and the target text area 308 includes the translated text "Venimos." For example, the translated text may have remained capitalized from earlier. Provided the typing status is static, the server 104 can again determine whether to swap the source and target languages. In this example, the target confidence score is extremely high (e.g., ~100%) and the other confidence scores are very low. Therefore, the server 104 can swap the source and target languages automatically in response to this determination. It should be noted that a swap of the source and languages could also have been manually initiated at any time by selection of a selectable swap option 320. As previously discussed, however, when swapping the source and target languages, the user 116 would expect that the underlying content would also be swapped.

More specifically, the server 104 can swap the source and target languages to obtain modified source and target languages. In this example, the modified source language can be the target language (Spanish) and the modified target language can be the source language (English). The server 104 can then utilize the translated text as a modified source text. The server 104 can then obtain a machine translation of the modified source text ("Venimos," or rather "venimos") from the modified source language (Spanish) to the modified target language (English) to obtain a translated modified source text "we come." The server 104 can then output the translated modified source text to the computing device 108. Receipt of the translated modified source text can cause the translated modified source text ("we come") in the target text area 308 opposing the source text area 304 displaying the modified source text ("venimos").

Figure 3E:
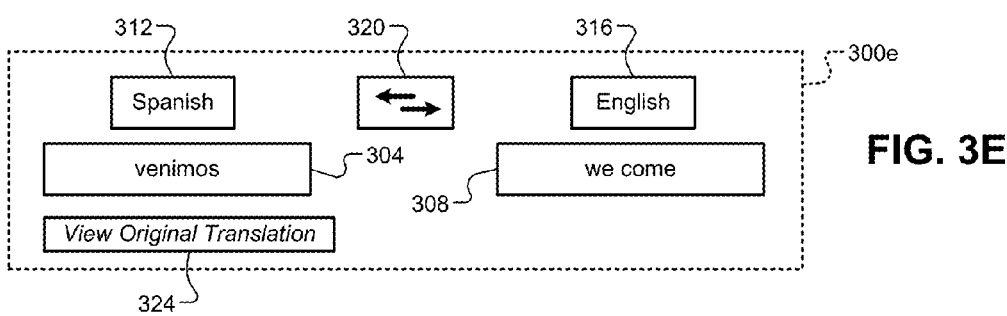

In the machine translation user interface 300e of FIG. 3E, the source text area 304 is shown to include the modified source text "venimos" and the target text area 308 is shown to include the translated modified source text "we come." Similarly, the source language area 312 is shown as specifying the modified source language "Spanish" whereas the target language area 316 is shown as specifying the modified target language "English." In situations where the language swap occurs, the server 104 may also output a selectable reset option 324 that can be selected to view the machine translation of the original source text ("venimos") from the original source language (English) to the target language (Spanish), which was "Venimos." This selectable reset option 324 could be selected by the user 116 when an incorrect or undesired language swap occurs. For example, an undesired language swap could occur when the original source text is a proper name or another unique word that is not in conventional dictionaries or recognized by conventional language models. In FIG. 3E, and for example only, selecting the selectable reset option 324 could cause the machine translation user interface 300d of FIG. 3D to be output and displayed by the computing device 108.

Figure 4:
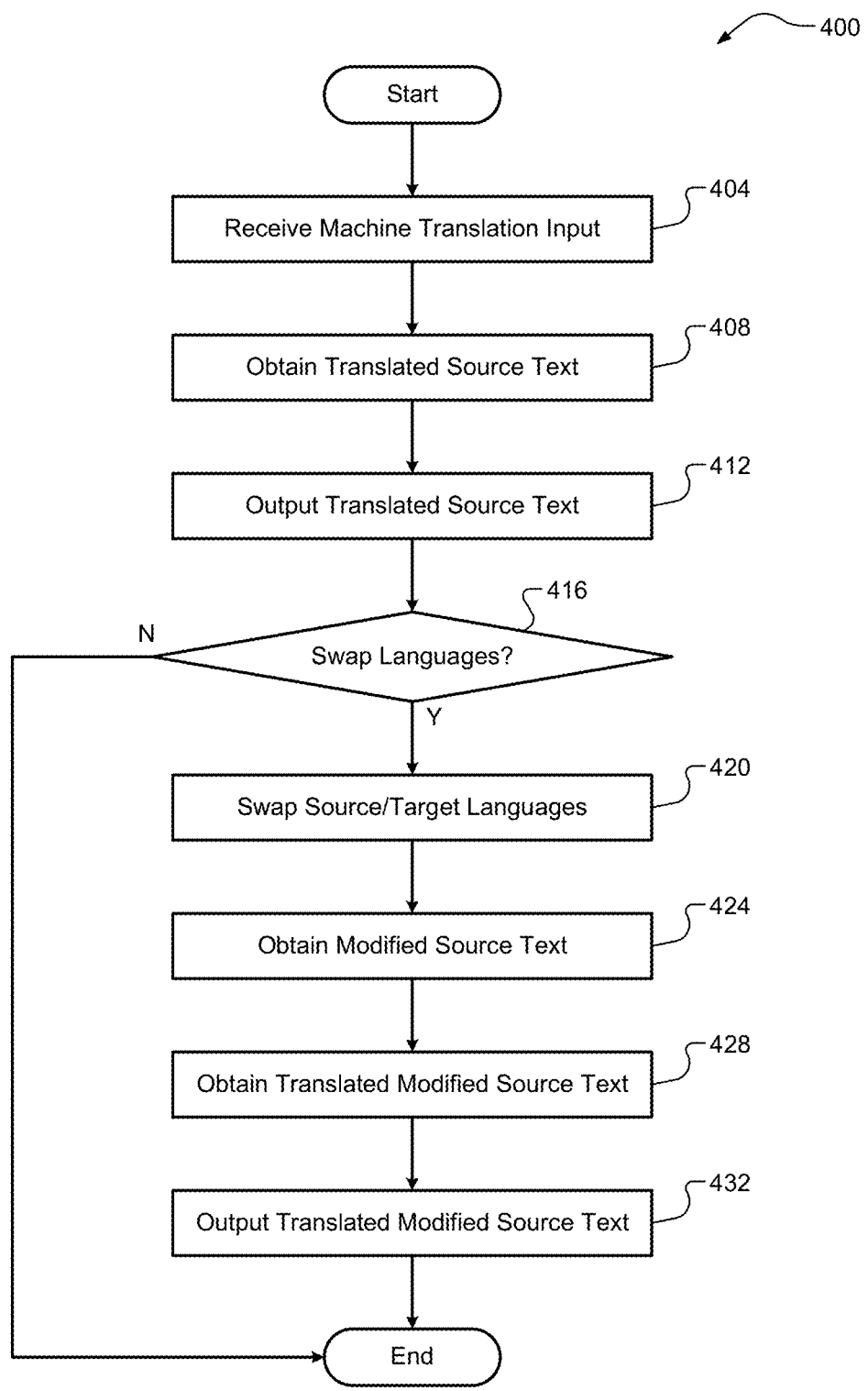
FIG. 4 illustrates a flow diagram of an example technique for automatically swapping languages and/or content for machine translation according to some implementations of the present disclosure.

Referring now to FIG. 4, a flow diagram of an example technique 400 for automatically swapping languages and/or content for machine translation according to some implementations of the present disclosure is illustrated. At 404, the server 104 can receive, from the computing device 108, a machine translation input specifying (i) a source text, (ii) a source language of the source text, and (iii) a target language for the source text. At 408, the server 104 can obtain a machine translation of the source text from the source language to the target language to obtain a translated source text. This translated source text may be obtained at the server 104 or obtained by the server 104 from another server.

At 412, the server 104 can output the translated source text to the computing device 108, thereby causing the computing device 108 to display the translated source text in the target text area 308 opposing the source text in the source area 304. At 416, the server 104 can determine whether to swap the source and target languages. If the source and target languages should not be swapped, the technique 400 can end or return to 404 for one or more additional cycles. If the source and target languages should be swapped, however, the technique 400 can proceed to 420. At 420, the server 104 can swap the source and target languages to obtain modified source and target languages.

At 424, the server 104 can obtain a modified source text, such as by utilizing the translated source text as the modified source text. At 428, the server 104 can obtain a machine translation of the modified source text from the modified source language to the modified target language to obtain a translated modified source text. At 432, the server 104 can output, to the computing device 108, the translated modified source text, thereby causing the computing device 108 to display the translated modified source text in the target area 308 opposing the modified source text in the source area 304. The technique 400 can then end or return to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   receiving, at a server from a computing device, a machine translation input specifying (i) a source text, (ii) a source language of the source text, and (iii) a target language for the source text;
   obtaining, at the server, a machine translation of the source text from the source language to the target language to obtain a translated source text;
   determining, at the server, whether to swap the source and target languages based on (i) the source text, (ii) a confidence score for the translated source text, and (iii) at least one language model, wherein swapping of the source and target languages is disabled when (a) auto-detection of the source language is enabled and (b) a typing status indicates that a user of the computing device is currently typing; and
   in response to determining to swap the source and target languages:
      swapping, at the server, the source and target languages to obtain modified source and target languages,
      utilizing, at the server, the translated source text as a modified source text,
      obtaining, at the server, a machine translation of the modified source text from the modified source language to the modified target language to obtain a translated modified source text, and
      outputting, from the server to the computing device, the translated modified source text.

2. The computer-implemented method of claim 1, further comprising outputting, from the server to the computing device, the translated source text, wherein receipt of the translated source text causes the computing device to display the translated source text in a target area opposing a source area displaying the source text.

3. The computer-implemented method of claim 2, wherein receipt of the translated modified source text causes the computing device to display the translated modified source text in the target area opposing the source area displaying the modified source text.

4. The computer-implemented method of claim 3, further comprising outputting, from the server to the computing device, a selectable reset option to view the machine translation of the source text from the source language to the target language.

5. The computer-implemented method of claim 4, further comprising:
   receiving, at the server from the computing device, a selection of the selectable reset option; and
   in response to receiving the selection, outputting, from the server to the computing device, the translated source text, wherein receipt of the translated source text causes the computing device to display the translated source text in the target area opposing the source area displaying the source text.

6. The computer-implemented method of claim 1, wherein determining to swap the source and target languages further comprises:
   calculating, at the server, a source confidence score, the source confidence score indicative of a degree of likelihood that the source text is in the source language; and
   determining, at the server, whether to swap the source and target languages based on a comparison between the source confidence score and a source confidence score threshold indicative of high degree of likelihood that the source text is in the source language.

7. The computer-implemented method of claim 6, wherein determining whether to swap the source and target languages further includes:
   calculating, at the server, a target confidence score, the target confidence score indicative of a degree of likelihood that the source text is in the target language; and
   determining, at the server, whether to swap the source and target languages based on a comparison between the target confidence score and at least one of (i) the source confidence score and (ii) a target confidence score threshold indicative of high degree of likelihood that the source text is in the target language.

8. The computer-implemented method of claim 1, further comprising:
   outputting, from the server to the computing device, a selectable swap option to view the machine translation of the source text from the target language to the source language;
   receiving, at the server from the computing device, a selection of the selectable swap option; and
   in response to receiving the selection, determining, at the server, to swap the source and target languages.

9. A server having one or more processors configured to perform operations comprising:
   receiving, from a computing device, a machine translation input specifying (i) a source text, (ii) a source language of the source text, and (iii) a target language for the source text;
   obtaining a machine translation of the source text from the source language to the target language to obtain a translated source text;
   determining whether to swap the source and target languages based on (i) the source text, (ii) a confidence score for the translated source text, and (iii) at least one language model, wherein swapping of the source and target languages is disabled when (a) auto-detection of the source language is enabled and (b) a typing status indicates that a user of the computing device is currently typing; and
   in response to determining to swap the source and target languages:
      swapping the source and target languages to obtain modified source and target languages, utilizing the translated source text as a modified source text, obtaining a machine translation of the modified source text from the modified source language to the modified target language to obtain a translated modified source text, and outputting, to the computing device, the translated modified source text.

10. The server of claim 9, wherein the operations further comprise outputting, to the computing device, the translated source text, wherein receipt of the translated source text causes the computing device to display the translated source text in a target area opposing a source area displaying the source text.

11. The server of claim 10, wherein receipt of the translated modified source text causes the computing device to display the translated modified source text in the target area opposing the source area displaying the modified source text.

12. The server of claim 11, wherein the operations further comprise outputting, to the computing device, a selectable reset option to view the machine translation of the source text from the source language to the target language.

13. The server of claim 12, wherein the operations further comprise:

receiving, from the computing device, a selection of the selectable reset option; and in response to receiving the selection, outputting, to the computing device, the translated source text, wherein receipt of the translated source text causes the computing device to display the translated source text in the target area opposing the source area displaying the source text.

14. The server of claim 9, wherein determining to swap the source and target languages further comprises:

calculating a source confidence score, the source confidence score indicative of a degree of likelihood that the source text is in the source language; and determining whether to swap the source and target languages based on a comparison between the source confidence score and a source confidence score threshold indicative of high degree of likelihood that the source text is in the source language.

15. The server of claim 14, wherein determining whether to swap the source and target languages further includes:

calculating a target confidence score, the target confidence score indicative of a degree of likelihood that the source text is in the target language; and determining whether to swap the source and target languages based on a comparison between the target confidence score and at least one of (i) the source confidence score and (ii) a target confidence score threshold indicative of high degree of likelihood that the source text is in the target language.

16. The server of claim 9, wherein the operations further comprise:

outputting, to the computing device, a selectable swap option to view the machine translation of the source text from the target language to the source language;

receiving, from the computing device, a selection of the selectable swap option; and in response to receiving the selection, determining to swap the source and target languages.

* * * * *